US007621736B2

(12) United States Patent
Mattice et al.

(10) Patent No.: US 7,621,736 B2
(45) Date of Patent: Nov. 24, 2009

(54) MOLD CHARGE DELIVERY

(75) Inventors: Daniel L. Mattice, Columbia City, IN (US); John J. Mallas, LaOtto, IN (US); David C. Thompson, Grabill, IN (US)

(73) Assignee: Rexam Closure Systems Inc., Perrysburg, OH (US)

( * ) Notice: Subject to any disclaimer, the term of this patent is extended or adjusted under 35 U.S.C. 154(b) by 721 days.

(21) Appl. No.: 11/171,692

(22) Filed: Jun. 29, 2005

(65) Prior Publication Data
US 2007/0001338 A1  Jan. 4, 2007

(51) Int. Cl.
*B26D 1/06* (2006.01)
*B26D 1/44* (2006.01)
*B28B 13/02* (2006.01)
*B28B 7/16* (2006.01)
*B28D 1/18* (2006.01)
*B26D 5/08* (2006.01)

(52) U.S. Cl. .................. 425/311; 425/241; 425/292; 425/297; 83/490; 83/646; 83/647

(58) Field of Classification Search ................. 425/241, 425/292, 294, 295, 311; 264/311, 312, 315; 83/490, 646, 647
See application file for complete search history.

(56) References Cited

U.S. PATENT DOCUMENTS

| 3,782,329 | A | 1/1974 | Everett |
| 3,867,081 | A | 2/1975 | Everett |
| 3,955,605 | A | 5/1976 | Zupan |
| 4,060,053 | A | 11/1977 | Ohmi |
| 4,080,136 | A | 3/1978 | Peller |
| 4,287,847 | A | 9/1981 | Ohmi |
| 4,640,673 | A | 2/1987 | Takeda et al. |
| 4,755,125 | A | 7/1988 | Takeda et al. |
| 4,995,803 | A * | 2/1991 | Champalaune et al. ...... 425/190 |
| 5,292,240 | A | 3/1994 | Capelle |
| 5,370,519 | A | 12/1994 | Shapcott |
| 5,386,971 | A | 2/1995 | Ingram |
| 5,456,587 | A | 10/1995 | Ingram |
| 5,596,251 | A | 1/1997 | Miller |
| 5,603,964 | A | 2/1997 | Rote et al. |
| 5,611,983 | A | 3/1997 | Ma et al. |
| 6,276,067 | B1 * | 8/2001 | Hsu ........................... 33/30.1 |
| 6,368,094 | B1 | 4/2002 | Dennis et al. |
| 6,422,854 | B1 | 7/2002 | Dennis et al. |

OTHER PUBLICATIONS

PCT search report of Jan. 11, 2007.*

* cited by examiner

*Primary Examiner*—Joseph S. Del Sole
*Assistant Examiner*—Lorraine Rios
(74) *Attorney, Agent, or Firm*—Reising Ethington P.C.

(57) ABSTRACT

An apparatus for placing a mold charge into a cavity includes a pair of hubs mounted for rotation around parallel axes, a link connected between the hubs at positions off-center relative to the parallel axes and a blade connected to the link. Rotation of the hubs causes the blade to travel in an elliptical path relative to an extrusion orifice to cut mold charges from the orifice and place the mold charges into cavities passing beneath the blade. The apparatus preferably includes a drive member that simultaneously rotates both of the hubs to drive the blade relative to the extrusion orifice and cavities. The blade preferably includes an arm that extends into a cavity to place a mold charge into the bottom of the cavity for consistent and accurate placement of the mold charges from one cavity to the next.

12 Claims, 3 Drawing Sheets

MOLD CHARGE DELIVERY

The present disclosure is directed to an apparatus and a method for placing mold charges into a machine for molding plastic articles, such as compression molding closure shells or sealing liners within closure shells.

BACKGROUND AND SUMMARY OF THE DISCLOSURE

Machines for compression molding closure shells, or for compression molding sealing liners within closure shells, typically include a turret or carousel that rotates around a vertical axis. A plurality of molds are provided around the periphery of the carousel in the form of male and female mold sections that are aligned along vertical axes parallel to the axis of rotation. The mold sections are driven between an open position in which a molded part is stripped from the male mold section and a charge of plastic material is placed in the female mold section, and a closed position in which the male and female mold sections are brought together to compression mold the part. In a machine that molds closure shells, charges of plastic material are placed directly into a female mold cavities. In a machine for molding sealing liners, premade closure shells are placed in a nest when the mold sections are open, and a charge of material for the liner is placed within the shell either before or after each shell is placed in the nest. U.S. patents that illustrate machines of this type for compression molding plastic closure shells include U.S. Pat. Nos. 5,670,100, 5,989,007, 6,074,583 and 6,478,568. U.S. patents that illustrate machines of this type for compression molding sealing liners within closure shells include U.S. Pat. No. 5,451,360.

In some instances, the molten plastic charge has been propelled or "thrown" onto the molding surface in a mold cavity, which can lead to inconsistent placement of the mold charge within the cavity. This can result in diminished part quality, and operating issues including increased complexity of the delivery apparatus and mold charge placement apparatus, and difficulties with missed delivery of the pellet charge or delivery wherein only a portion of the pellet is received within the mold cavity. Other systems have required an individual cutter for every molding position or cavity, and this adds significantly to the capital, manufacture and maintenance costs and the overall complexity of the system and its controls.

The present disclosure involves a number of aspects or inventions, which may be implemented separately from or in combination with each other.

An apparatus for placing a mold charge into a cavity (e.g., either a mold cavity or the cavity of a premade closure shell), in accordance with a first aspect of the present disclosure, includes a pair of hubs mounted for rotation around parallel axes, a link connected between the hubs at positions off-center relative to the parallel axes and a blade connected to the link. Rotation of the hubs causes the blade to travel in an elliptical path relative to an extrusion orifice to cut mold charges from the orifice and place the mold charges into cavities passing beneath the blade. The apparatus preferably includes a drive member that simultaneously rotates both of the hubs to drive the blade relative to the extrusion orifice and cavities. The blade preferably includes an arm that extends into a cavity to place a mold charge into the bottom of the cavity for consistent and accurate placement of the mold charges from one cavity to the next. The link may be connected to each hub at a different distance relative to the axes of the hubs and may be adapted to pivot or rotate relative to the axes of rotation of the hubs as the hubs are rotated. Further control of the path of the blade may be accomplished by phased rotation of the hubs relative to each other to vary the path of travel of the blade.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
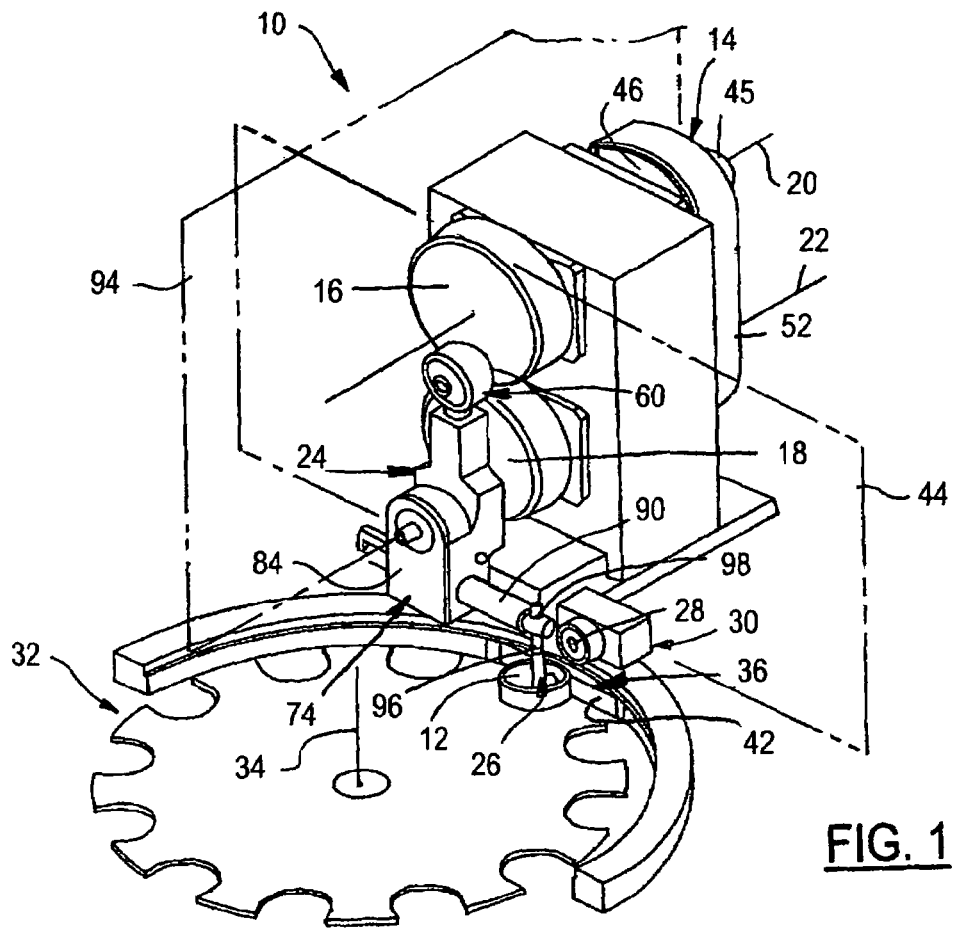
FIG. 1 is a perspective view of one presently preferred embodiment of a mold charge delivery apparatus for placing mold charges into vertically oriented cavities of a molding machine.

Referring in more detail to the drawings, FIGS. 1-4 illustrate a mold charge delivery apparatus 10 that delivers plastic mold charges into a cavity 12, such as a closure mold cavity or the cavity of a premade closure shell in which a sealing liner is to be formed. The apparatus 10 includes a drive assembly 14, a pair of hubs 16, 18 coupled to the drive assembly 14 and rotatable around parallel axes 20, 22 respectively, a link 24 associated with both of the hubs 16, 18, and a blade 26 carried by the link 24 for movement relative to an extrusion orifice 28 of an extruder 30 and one or more cavities 12 that pass in sequence beneath the extrusion orifice 28. As the hubs 16, 18 are rotated, the link 24 and blade 26 are moved to cause the blade 26 to receive a molten plastic charge from the extrusion orifice 28 and deliver the molten plastic charge into a cavity 12 for subsequent molding of the plastic charge into a desired part, such as a closure shell or a liner for a closure shell. In the currently preferred implementation shown in the referenced drawings, the mold charges are placed into premade closure shells carried around the periphery of a carousel 32 rotating about a vertical axis 34 and hence moving the premade closure shells horizontally relative to the extrusion orifice 28. Carousel 32 can feed the closure shells, with mold charges placed therein, to a vertical axis liner molding machine, or to a horizontal axis vertical wheel liner molding machine of the type shown in U.S. application Ser. No. 11/155,275, filed on Jun. 17, 2005. The mold charge delivery apparatus 10 can be used equally as well in combination with a vertical axis machine for compression molding closure shells, or a vertical wheel molding machine that rotates the cavities around a horizontal axis, such as is disclosed in U.S. Pat. No. 7,247,014. Both of such applications are incorporated herein by reference.

In the presently preferred implementation, the horizontally disposed carousel 32 rotates around its vertical axis 34 relative to a cam 36 that displaces the cavities 12 (e.g., premade closure shells) relative to the periphery of the carousel 32 when the cavities 12 are rotated past the cam 36. This may be accomplished, for example, by slidably mounting the cavities 12, or associated mold sections that carry the cavities, for radial movement relative to the carousel 32 when engaged by the cam 36. The associated mold sections may include one or more cam followers or rollers to facilitate the displacement of the cavities relative to the carousel. Desirably, the cam 36 is positioned within the area of the extrusion orifice 28 and mold charge delivery apparatus 10 to provide a consistent, preferably straight-line, path of travel relative to the delivery apparatus 10 and thereby facilitate the delivery of mold charges into the cavities 12. In the implementation shown, the cam 36 has a generally flat cam surface 42 providing a generally linear portion of travel of the cavities 12 that is generally parallel to a plane 44 containing the path of travel of the blade 26 to facilitate alignment of the cavities 12 and blade 26 during the portion of the rotation of the carousel 32 wherein the mold charges are placed into the cavities 12.

The drive assembly 14 of the mold charge delivery apparatus 10 preferably includes an electric motor (not shown) that rotates a drive shaft 45 on which a drive wheel 46 is concentrically mounted. A driven member or first hub 16 is concentrically mounted on the drive shaft 44 for co-rotation therewith. A driven shaft 48 (FIG. 4) is carried by the apparatus for rotation around the axis 22 parallel to the axis 20 of the drive shaft 45, and a driven wheel 50 is concentrically mounted on the driven shaft 48 and coupled to the drive wheel 46 by a power transmission member, such as a chain or belt 52. The second hub 18 is also concentrically mounted on the driven shaft 48 for co-rotation therewith. Accordingly, in one presently preferred implementation, the first hub 16 and second hub 18 are simultaneously rotated around spaced parallel axes 20, 22. Preferably, the axes 20, 22 are perpendicular to the axis of rotation 34 of the carousel 32. The motor may be servo controlled for desired synchronization with the rotation of the carousel 32 to facilitate accurate alignment of the blade 26 with the cavities as will be discussed in more detail. Other drive arrangements may be employed, such as separate motors or drives for each of the hubs 16, 18 and/or phased rotation of the hubs relative to each other to permit further variance and control of the path of travel of the link 24 and blade 26. Also, the orientation of the hubs 16, 18 can be different from those described herein. For example, the axes of rotation 20, 22 of the hubs 16, 18 could be vertically arranged for use with a machine that moves the cavities 12 about a horizontal axis. As another alternative, rotation of hubs 16, 18, and rotation of carousel 32, can be mechanically synchronized with rotation of the vertical or horizontal mold wheel.

Figure 4:
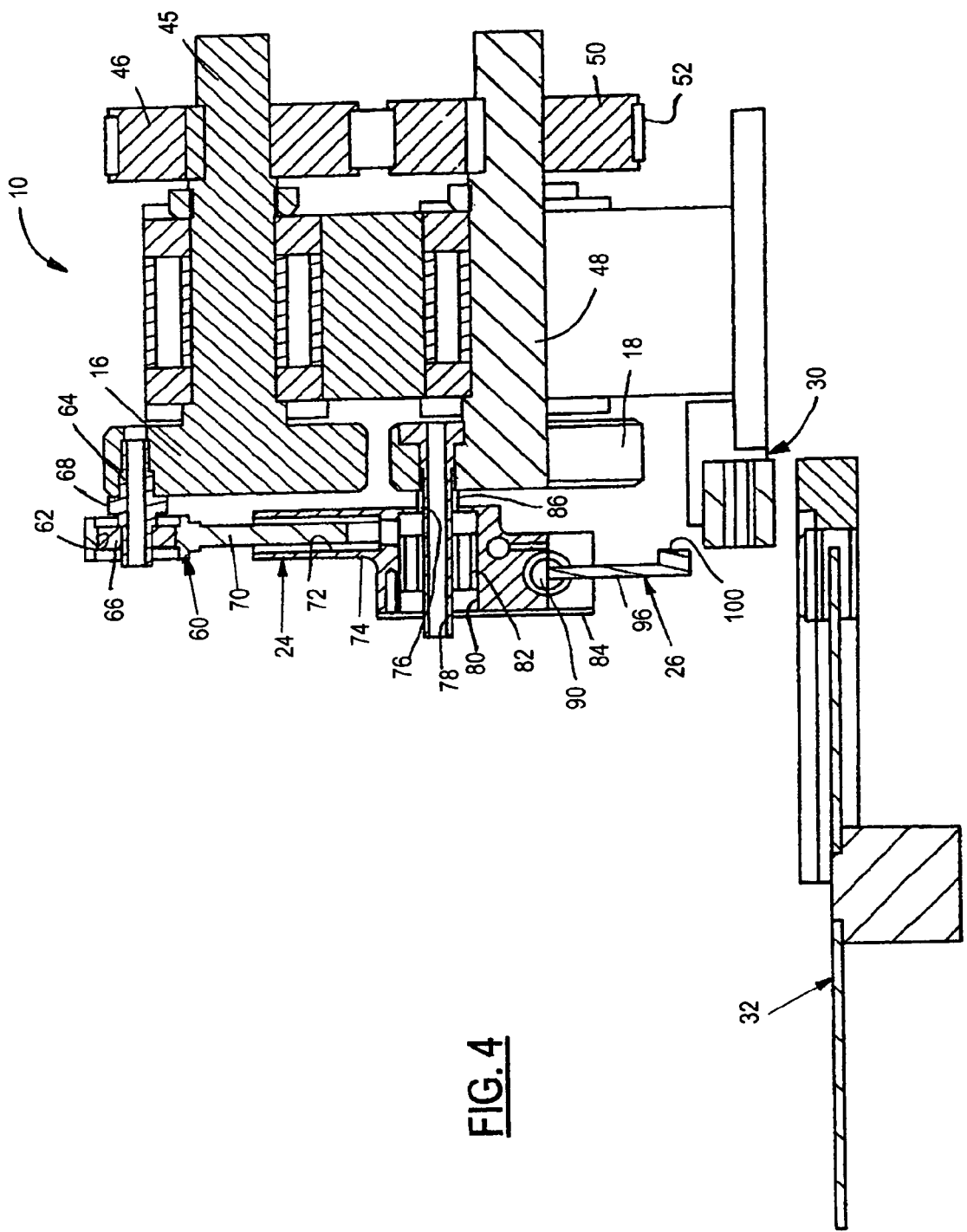
FIG. 4 is a sectional view taken generally along line 4-4 in FIG. 2.

The link 24 is coupled to each of the hubs 16, 18 and is driven for movement relative to the extrusion orifice 28 in response to rotation of the hubs 16, 18. As best shown in FIG. 4, the link 24 includes a first portion 60 having a through bore 62 adapted to receive an end of an axle 64 that is carried by the first hub 16 at a location offset or spaced from the axis 20 of the first hub 16. A bearing 66 preferably is carried by the link 24 around the axle 64 to permit rotation of the first portion 60 of the link 24 about the axle 64 which is fixed to and moves with the first hub 16 as it rotates. The first portion 60 of the link 24 may be spaced from the first hub 16 by a radially outwardly extending flange 68 of the axle 64 disposed between the first hub 16 and first portion 60 of the link 24 in assembly. The first portion 60 also includes a rod 70 that is slidably received for reciprocation within a complimentary cavity 72 formed in a second portion 74 of the link 24.

Figure 2:
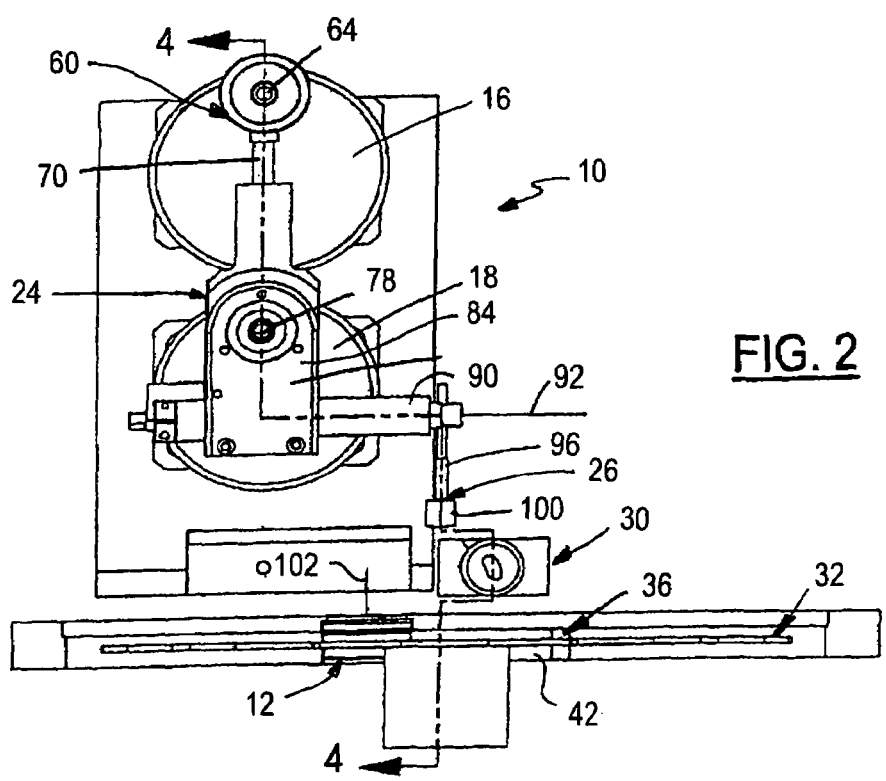
FIG. 2 is a front view of the mold charge delivery apparatus.
Figure 3:
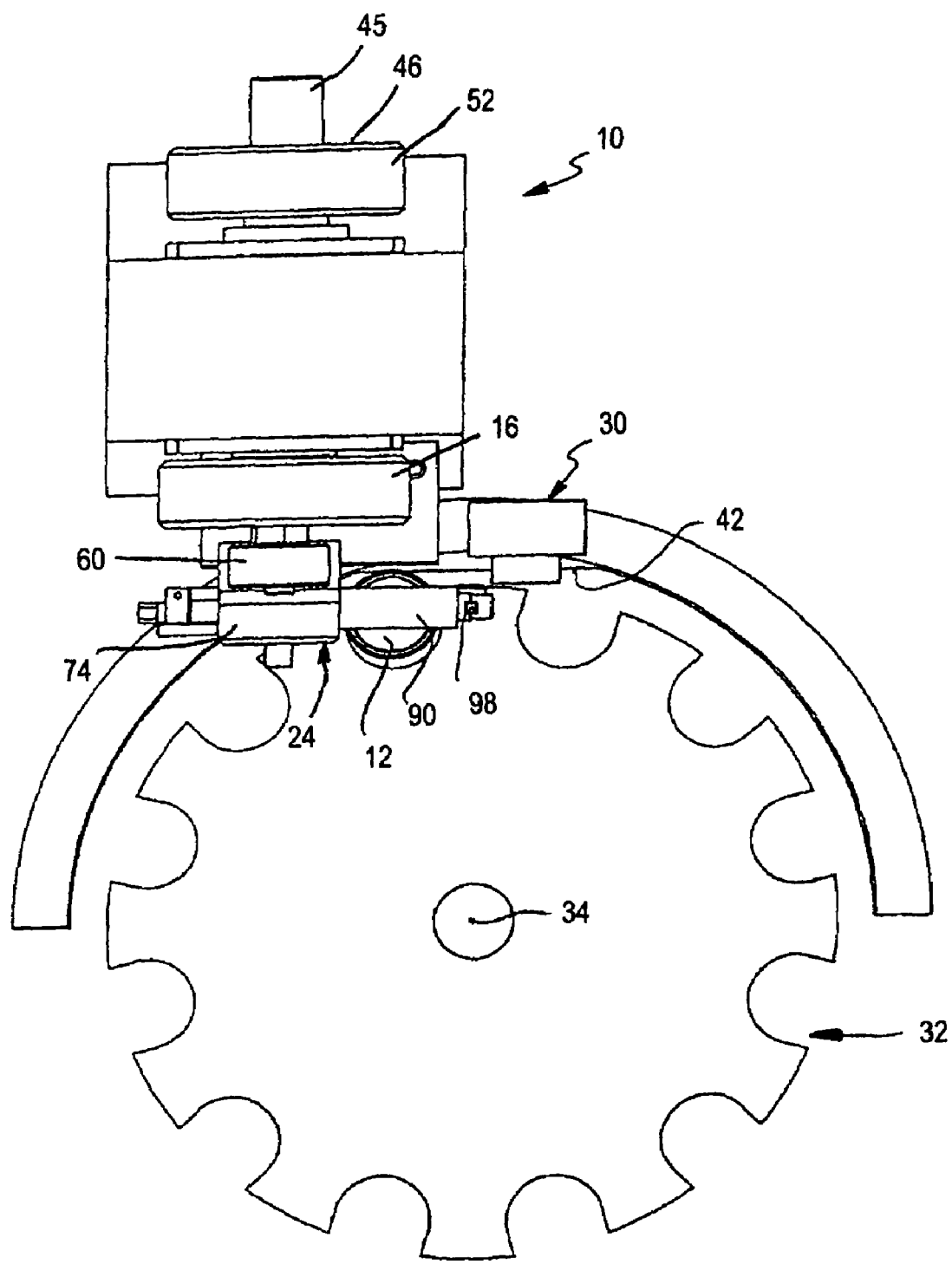
FIG. 3 is a plan view of the mold charge delivery apparatus.

The second portion 74 of the link 24 includes a through bore 76 adapted to receive an axle 78 that is carried by and extends from the second hub 18. The through bore 76 preferably includes a counter bore 80 in which an annular bearing 82 is received about an end of the axle 78 so that the second portion 74 of the link 24 can rotate or pivot about the second axle 78. A cover plate 84 may be secured to the second portion 74, as best shown in FIGS. 2 and 4. An axially extending annular wall 86 may maintain a suitable spacing between the second hub 18 and the second portion 74 of the link 24. The rod 70 preferably slides in the cavity 72 along a line or plane that intersects the axles 64, 78 or other point of attachment of the link 24 to the hubs 16, 18.

An arm 90 may extend from or be formed as part of the link 24. As shown, the arm 90 extends outwardly from the second portion 74 of the link 24 along an axis 92 that is perpendicular to the axes of rotation 20, 22 of the hubs 16, 18 and preferably in the plane 44 containing the path of travel of the blade 26. The arm 90 preferably is slidably adjustable relative to the second portion 74 of the link 24 to facilitate adjustment of the position of the blade 26, which is carried by the arm 90, relative to the extrusion orifice 28 and cavities 12.

The blade 26 is carried by the arm 90, and preferably includes a shank 96 disposed through a bore 98 in the arm 90 and retained thereon by any suitable method, including by mating threads, threaded fastener, clamp or weld for example. The blade 26 and its shank 96 preferably are disposed perpendicular to the arm 90, parallel to a plane 94 containing the axes of rotation 20, 22 of the hubs 16, 18, and preferably are parallel to the flat cam surface 42. The end 100 of the blade 26 preferably is cup-shaped and is adapted to sever an extrudate stream discharged from the extrusion orifice 28 into an individual mold charge pellet that is carried by the blade 26 and placed into a cavity 12 for subsequent formation into a molded part.

The axles 64, 78 or other points of attachment of the link 24 to the hubs 16, 18 can be moved relative to the axis of rotation 20, 22 of the hubs 16, 18, as desired. The hubs 16, 18 may have different diameters and the distance of the axis of each axle 64, 78 from the axis 20, 22 of its respective hub 16, 18 may be different. Accordingly, as the hubs 16, 18 are co-rotated, the distance between the axles 64, 78 will vary and the rod 70 of the first link portion 60 will reciprocate within the cavity 72 of the second link portion 74. The difference in the amount of offset of each axle 64, 78 with respect to its hub axis 20, 22 will also cant or incline the link 24, or a plane containing the axis of each axle 64, 78, relative to the plane 94 containing the axes of rotation 20, 22 of the hubs 16, 18.

As best shown in FIG. 2, in one presently preferred implementation, and in one angular position of the hubs 16, 18 and link 24, the plane containing the axes of the axles 64, 78 is coincident with the plane 94 containing the axes of rotation 20, 22 of the hubs 16, 18. The blade 26 and link 24 are generally moved in an elliptical path that is in the plane 44 perpendicular to the axes of rotation 20, 22 of the hubs 16, 18 and parallel to the flat cam surface 42 of the carousel 32 so that the blade 26 can be axially aligned with a cavity 12 passing linearly along the cam 36 to facilitate alignment of the blade 26 with the cavity 12 and subsequent placement of a mold charge into the cavity 12. The elliptical path of the blade 26 includes horizontal and vertical components to facilitate shearing the extrudate stream from the extrusion orifice 28 and lateral alignment and registry with the moving cavities 12, and vertical movement of the blade 26 relative to the cavities 12. In one presently preferred implementation, the blade 26 is moved laterally at generally the same speed as the cavities 12, and during this lateral movement the blade 26 is moved axially (relative to the axis of the cavity) into and out of the cavity 12 to deposit a mold charge onto or adjacent to a lower surface of the cavity 12. Preferably, the blade 26 is generally concave or cup-shaped with a generally open lower end so that the mold charge may engage the lower portion of the cavity 12 and, due to, for example, temperature differences therebetween, surface tension in the molten plastic charge and/or friction permits removal of the blade 26 from the cavity 12 while the mold charge remains in position in the bottom of the cavity 12. This provides an accurate, repeatable and consistent placement of the mold charges into the cavities 12. Continued rotation of the hubs 16, 18 creates a vertical movement of the link 24 that withdraws the blade 26 from the cavity 12, and further movement of the link 24 and blade 26 position the blade 26 for a subsequent stroke and delivery of a subsequent charge into the next cavity 12 in sequence. Preferably, the plane 44 containing the path of travel of the blade 26 is parallel to an axis 102 (FIG. 2) of the cavities 12.

As a modification to facilitate carrying and placement of the mold charge, an air line can be connected to blade 26 to apply vacuum to the blade to hold the mold charge during transport and/or to apply air under pressure to facilitate release and placement of the mold charge within the cavity.

The disclosure has been presented in conjunction with several presently preferred embodiments, and a number of additional modifications and variations have been discussed. Other modifications and variations readily will suggest themselves to persons of ordinary skill in the art. The disclosure is intended to embrace all such modifications and variations as fall within the spirit and broad scope of the appended claims.

The invention claimed is:

1. Apparatus for placing mold charges into a cavity, which includes:
   a pair of hubs mounted for rotation around parallel axes,
   a link connected between said hubs at positions off-center to said parallel axes and including a first portion connected to a first one of the pair of hubs and a second portion connected to a second one of the pair of hubs, wherein the first and second portions are constructed and arranged to reciprocate with respect to one another, and
   a blade connected to said link for traveling in an elliptical path past an extrusion orifice to cut mold charges from said orifice and place the charges into cavities passing in sequence beneath said blade.

2. Apparatus for placing mold charges into a cavity, which includes:
   a pair of hubs mounted for rotation around parallel axes,
   a link connected between said hubs at positions off-center to said parallel axes, and
   a blade connected to said link for traveling in an elliptical path past an extrusion orifice to cut mold charges from said orifice and place the charges into cavities passing in sequence beneath said blade
   wherein said blade includes a shank for extending into the cavity to place the mold charge into the bottom of the cavity.

3. The apparatus set forth in claim 1 including a drive for simultaneously rotating both of said hubs.

4. The apparatus set forth in claim 3 wherein the drive permits independent control of the rotation of at least one of said hubs relative to the other hub.

5. The apparatus of claim 1 wherein the elliptical path traveled by the blade lies in a plane that is perpendicular to a plane containing said parallel axes.

6. The apparatus of claim 1 wherein at least one of the first portion and second portion are connected for pivoted movement relative to its respective hub.

7. The apparatus of claim 1 wherein the first portion is slidably moveable relative to the second portion along a line intersecting the points of attachment of the first portion and second portion to their respective hubs.

8. Apparatus for placing mold charges into a cavity, which includes:
   a pair of hubs mounted for rotation around parallel axes,
   a link connected between said hubs at positions off-center to said parallel axes, wherein the link includes a first portion connected to a first one of the pair of hugs and a second portion connected to a second one of the pair of the hubs, and
   a blade connected to said link for traveling in an elliptical path past an extrusion orifice to cut mold charges from said orifice and place the charges into cavities passing in sequence beneath said blade,
   wherein the first portion is connected to its respective hub at a first distance from the axis of rotation of that hub and the second portion is connected to its respective hub at a second distance from the axis of that hub that is not the same as the first distance.

9. Apparatus for placing mold charges into a cavity, which includes:
   a pair of hubs mounted for rotation around parallel axes,
   a link connected between said hubs at positions off-center to said parallel axes, and
   a blade connected to said link for traveling in an elliptical path past an extrusion orifice to cut mold charges from said orifice and place the charges into cavities passing in sequence beneath said blade,
   wherein in said elliptical path the blade is moved into and out of said cavities as the cavities are moved relative to the extrusion orifice.

10. Apparatus for placing mold charges into a cavity, which includes:
    a pair of hubs mounted for rotation around parallel axes,
    a link connected between said hubs at positions off-center to said parallel axes, and
    a blade connected to said link for traveling in an elliptical path past an extrusion orifice to cut mold charges from said orifice and place the charges into cavities passing in sequence beneath said blade,
    wherein the blade is cup-shaped and has a generally open end that permits a mold charge to engage the cavity in which it is received to facilitate removal of the mold charge from the blade.

11. An apparatus for molding a plastic article, including:
    an extruder having an extrusion orifice through which a source of mold charge material is provided,
    a turret that moves at least one cavity along a predetermined path and has a cam for moving said at least one cavity in a fixed path relative to the extruder, and
    a delivery apparatus including a pair of hubs mounted for rotation around parallel axes, a link connected between said hubs at positions off-center to said parallel axes, and a blade connected to said link for traveling in an elliptical path past the extrusion orifice to cut mold charges from said orifice and place the charges into cavities passing in sequence beneath said blade.

12. The apparatus of claim 11 wherein said turret rotates about a vertical axis and moves the cavities horizontally past the extruder.

* * * * *

UNITED STATES PATENT AND TRADEMARK OFFICE
CERTIFICATE OF CORRECTION

PATENT NO. : 7,621,736 B2  Page 1 of 1
APPLICATION NO. : 11/171692
DATED : November 24, 2009
INVENTOR(S) : Mattice et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1183 days.

Signed and Sealed this

Twenty-sixth Day of October, 2010

David J. Kappos
*Director of the United States Patent and Trademark Office*